United States Patent [19]

Meinhardt

[11] Patent Number: 5,052,454
[45] Date of Patent: Oct. 1, 1991

[54] GUIDE SYSTEM FOR ROUTERS

[76] Inventor: Gregory J. Meinhardt, 6116 NE. 61st St., Kansas City, Mo. 64119

[21] Appl. No.: 599,438

[22] Filed: Oct. 18, 1990

[51] Int. Cl.$^5$ .............................................. B27C 5/10
[52] U.S. Cl. ............................... 144/144.5 R; 33/427; 33/429; 144/136 C; 144/137; 144/144.5 GT; 409/175
[58] Field of Search .................... 33/427, 429, 197; 144/144 R, 144.5, 137, 134 D, 136 C, 144.5 GT; 409/175, 178, 181, 182; 408/115

[56] References Cited

U.S. PATENT DOCUMENTS

| | | | |
|---|---|---|---|
| 2,652,866 | 9/1953 | Drain | 144/144.5 |
| 2,918,953 | 12/1959 | Wright . | |
| 3,099,299 | 7/1963 | Gilfry . | |
| 3,199,556 | 8/1965 | Wing . | |
| 3,540,130 | 11/1970 | French . | |
| 3,782,431 | 1/1974 | Cox . | |
| 3,910,327 | 10/1975 | Heckenlaible | 144/144 R |
| 3,985,168 | 10/1976 | Lundquist . | |
| 4,630,657 | 12/1986 | Obradovich . | |
| 4,966,507 | 10/1990 | Hanks | 144/144.5 |

Primary Examiner—W. Donald Bray
Attorney, Agent, or Firm—Litman, McMahon & Brown

[57] ABSTRACT

A portable routering apparatus for use with a hand-held router to rout figures, designs, alphanumeric characters and the like without the requirement of a template for each figure, design, or character, wherein the apparatus is adjustable to accommodate workpieces of variable width and thickness and unlimited length. The apparatus consisting of a base, an adjustable workpiece clamp, a router guide fence, a plurality of indexing scales, and a plurality of guide blocks, wherein a workpiece is positioned on the base and secured with the clamp, and the movement of a hand-held router thereon is guided by the guide fence and blocks and positioned using the indexing scales.

17 Claims, 2 Drawing Sheets

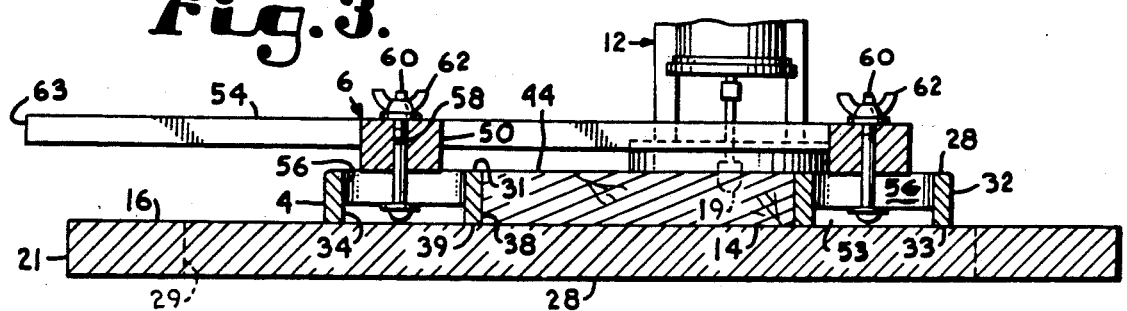
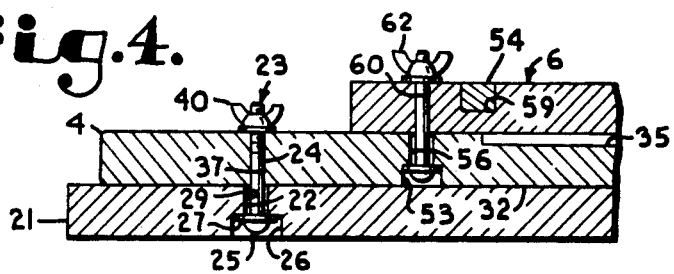
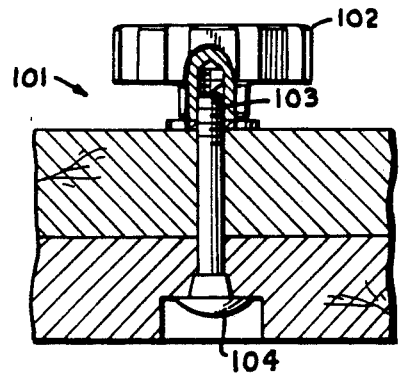
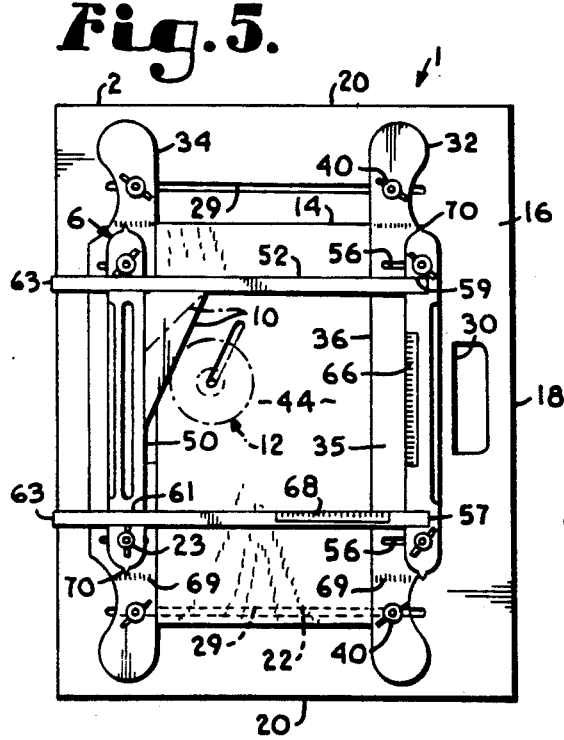
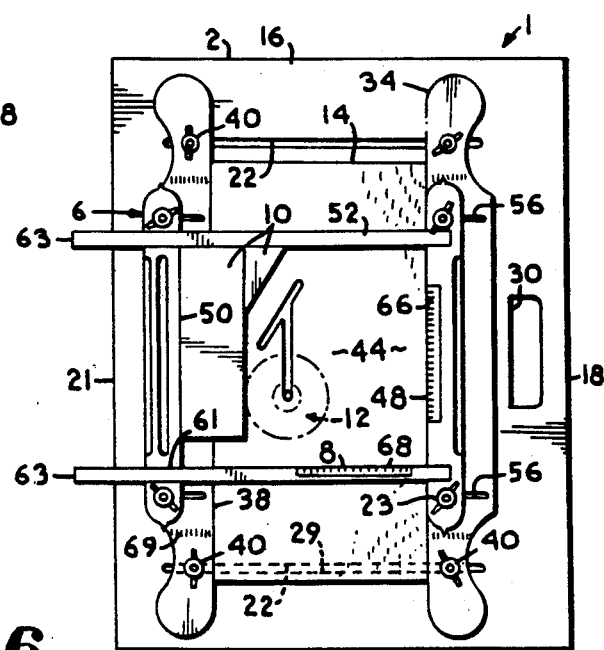

GUIDE SYSTEM FOR ROUTERS

BACKGROUND OF THE INVENTION

1. Field of the Invention

The present invention relates to devices for the hand routering of alphanumeric characters, designs, and the like in the surfaces of workpieces such as boards, laminates, and the like.

2. Description of the Prior Art

The use of hand-held routers to produce letters and other characters in wood boards and the like is well known. Generally, a template or tracing of the character to be routed is laid over the workpiece or adjacent thereto and traced by the operator to create the desired figure. Numerous devices available have a limited ability to operate in conjunction with various sizes of workpieces. Typical shortcomins with the currently available devices include limitations on sizes and varieties of characters presented by the availability of templates and tracings. Likewise, devices with the ability to accept only a limited range of workpiece sizes tend to have limited flexibility to produce various figures and designs on a variety of materials.

Several devices currently available attempt to overcome these shortcomings. However, these devices do not provide the capability of routering a string of characters of practically unlimited size and complexity on workpieces of variable width and practically unlimited length. For instance, the Obradvich U.S. Pat. No. 4,630,657 teaches a device for creating unlimited length dados, grooves and the like wherein a router is fixtured in the apparatus and the apparatus is moved longitudinally along the workpiece to create the cut and the fixtured router can be laterally moved to generate cuts wider than the bit or rectangular designs. However, the Obradvich device has certain limitations on the figures it can create and does not provide for operation of the router independent of the fixture. Likewise, the Lundquist U.S. Pat. No. 3,985,168; the French U.S. Pat. No. 3,540,130; and the Wing U.S. Pat. No. 3,199,556 all show adjustable holding jigs for use with dedicated or composite templates and tend to have operational limits.

SUMMARY OF THE INVENTION

The present invention addresses the above shortcomings by providing a simple, portable device for use with handheld routers for producing a practically unlimited variety of characters and figures of variable sizes without the necessity of templates or constraints on the length of the workpiece. The present invention consists of a planar base for support, a workpiece clamp for securing a workpiece therein, a router guide fence for guiding the movements of a router, a plurality of guide blocks for use in conjunction with the guide fence to produce non-linear, angular and offset cuts and a plurality of indexing scales for coordinating the locations of characters and the individual cuts comprising the characters.

OBJECTS OF THE INVENTION

Therefore, the objects of the present invention are to provide: an apparatus to route alphanumeric characters and the like without a template; an apparatus that is portable; an apparatus that can accept workpieces of various widths, thicknesses, and practically unlimited lengths; and an apparatus that is simple to use, economical to produce and which is especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is an enlarged and fragmentary vertical cross-sectional view taken generally along line 3—3 in FIG. 2, showing bolts and wingnuts securing the guide fence to the workpiece clamp.

FIG. 4 is an enlarged and fragmentary vertical cross-sectional view taken generally along line 4—4 in FIG. 2, showing bolts and wingnuts securing the workpiece clamp to the base and the guide fence to the workpiece clamp.

FIG. 5 is a top plan view showing a wedge-shaped guide block in conjunction with a router shown in phantom lines making a diagonal cut.

FIG. 6 is a top plan view showing a rectangular guide block in conjunction with a router shown in phantom lines making a longitudinal cut.

FIG. 7 is an enlarged and fragmentary vertical cross-sectional view of a portable routering apparatus comprising a modified or alternative embodiment of the present invention with female-threaded knobs substituted for the wingnuts of the first-described embodiment.

DETAILED DESCRIPTION OF THE PREFERRED EMBODIMENTS

Figure 1:
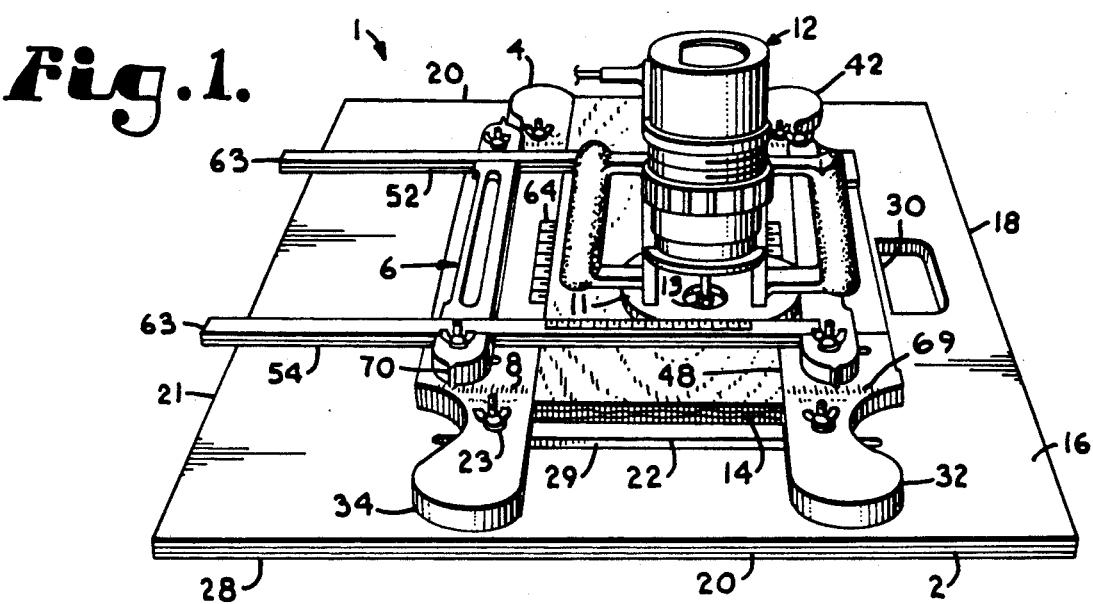
FIG. 1 is a perspective view of a portable routering apparatus in accordance with the present invention illustrated in conjunction with a router, showing a workpiece engaged therein.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference number 1 generally designates a routering apparatus or router guide system in accordance with the present invention. The routering apparatus 1 generally comprises: a base 2; a workpiece clamp 4; a router guide fence 6; a plurality of indexing scales 8; and a plurality of guide blocks 10 shown in conjunction with a hand-held router 12 and a workpiece 14. The router 12 includes a base 11 and a bit 13 projecting downwardly therefrom.

The base 2 comprises a planar, rigid, and substantially rectangular datum or upper surface 16 and a lower surface 17 which are oriented substantially horizontally in operation. For the purpose of description, one edge of the base 2 is identified as the top edge 18, the two edges adjacent thereto as the side edges 20, and the remaining edge as the bottom edge 21. However, the designation of edges as "top", "side", and "bottom" are for descriptive purposes only and are not intended to be construed as limiting. The base 2 includes a pair of longitudinal slots 22 therethrough in substantially parallel orientation to the side edges 20, one slot 22 spacedly related to each side edge 20, see FIG. 2.

The workpiece clamp 4 is selectively securable to the base 2 with a plurality of threaded clamp-to-base fasteners 23, each having a threaded shaft 24 and a head 25. The underside of the slots 22 are stepped, having a greater width 26 below a step or channel 27 open at the lower surface 17 of the base 2 relative to the slot width 29 at the datum surface 16, so as to permit passage of the shaft 24 upwardly therethrough and engagement of the head 25 with the step 27, the head 25 being flush with or above the lower surface 17, see FIG. 4. Spacedly related to and oriented parallel to the top edge 18 is the cutout handle 30, comprising an opening of sufficient size so as to permit passing one's fingers therethrough and grasping the section of base 2 between the cutout handle 30 and the top edge 18.

Figure 2:
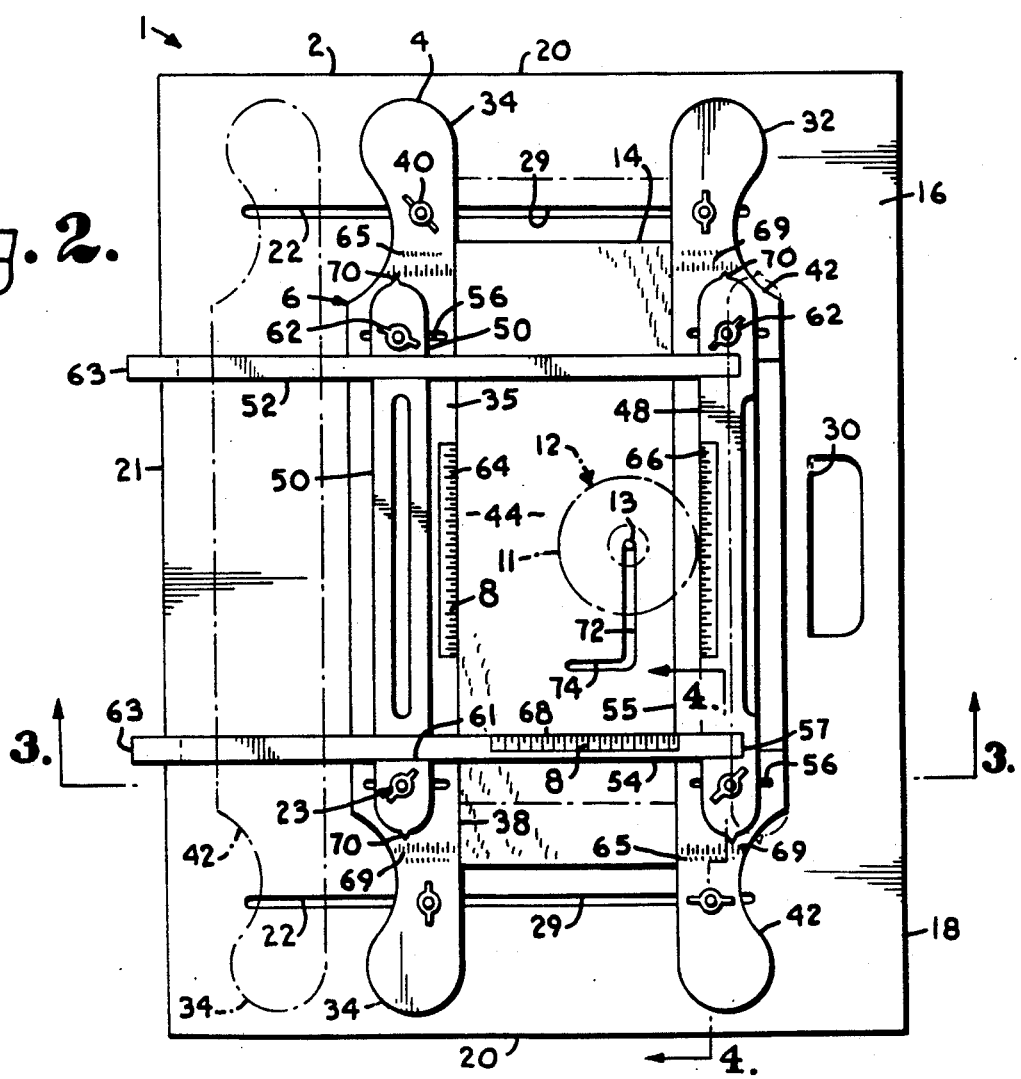
FIG. 2 is an enlarged top plan view of the apparatus showing a base, a workpiece clamp, a router guide fence, indexing scales, and in phantom lines, a router making a longitudinal cut and the workpiece clamp in an alternative position.

Spacedly positioned in parallel orientation to the top edge 18 on the datum surface 16 is the workpiece clamp 4, see FIG. 2. The workpiece clamp 4 includes first and second movable jaws 32 and 34 with upper surfaces 28, 31 and lower surfaces 33, 39 respectively. The jaws 32 and 34 are rigid, longitudinal members having parallel and opposing workpiece engaging surfaces or edges 36 and 38 respectively, see FIG. 2. The workpiece engaging surfaces 36 and 38 in this embodiment are shown as planar continuous surfaces substantially perpendicular to the datum 16, however it is foreseen that these surfaces could be configured alternatively, for example serrated and discontinuous or tapered from top to bottom, and as such the configuration shown in the present embodiment is not intended as limiting.

The jaws 32 and 34 contain a plurality of through holes 37 coaxial with the slots 22, through which the fasteners 23 are passed to secure the clamp 4. Each jaw 32, 34 includes a recess 35 between the fasteners 23 whereat part of the jaw upper face is removed, e.g. by milling, to provide inner center portions of the jaws 32, 34. Engagable with the fasteners 23 are wingnuts 40 for selectively securing the position of the jaws 32 and 34. The ends of the jaws 32 and 34 are contoured to provide handles 42 so as to enable manipulation of the jaws 32 and 34 and the application of manual clamping forces thereon, see FIG. 2.

To secure the workpiece 14 in the apparatus, the first jaw 32 is selectively positioned on the datum surface 16 and secured using fasteners 23 and wingnuts 40 so as to approximately center the workpiece 14 to be engaged therewith on the base 2. The workpiece 14 includes upper and lower surfaces 15, 17 and opposite workpiece edges 19. The workpiece lower surface 17 is placed against the base upper surface 16 and can be slid thereon when not secured by the clamp 4. The clamp 4 is adapted for securing the workpiece 14 by engaging the jaw surfaces 36, 38 against the workpiece edges 19 whereby the workpiece upper surface 15 is exposed between the jaws 32, 34 for routing. Manual pressure is applied to the handles 42 to clamp the workpiece 14 therebetween. While maintaining clamping forces, the second jaw 34 is then secured using fasteners 23 and wingnuts 40. To remove or reposition the workpiece 14, the wingnuts 40 are loosened and the second jaw 34 is retracted.

When the workpiece 14 is positioned between the clamp jaws 32 and 34, the top surfaces of the jaws and workpiece ideally form a continous and substantially planar surface for the operation of a router 12 thereon, called the router working surface 44, except for the jaw recesses 35 which are positioned slightly below the level of the upper face of the workpiece 14. The recesses 35 permit the router 12 to pass over portions of the jaws 32, 34. To obtain a substantially planar working surface 44, shims (not shown) can be selectively placed under the clamp jaws 32 and 34 so as to raise the top surface of the jaws to be level with the top surface of the workpiece. A relatively continuous and level working surface 44 prevents the router 12 from rocking and catching when transversing the clamps 32 and 34 and the workpiece 14, thereby providing smooth and uniform cuts.

Adjustably positioned on the working surface 44 is the router guide fence 6. The fence 6 is substantially rectangular and is constructed of a rigid material, see FIG. 2. The fence 6 is oriented so as to have two opposing members 48 and 50 spacedly related and substantially parallel to the workpiece engaging surfaces 36 and 38. The fence members 48, 50 are located on the top surfaces of the jaws 32 and 34. The fence 6 also includes rails 52 and 54 with first ends 56 and second ends 58. The first ends 56 are rigidly connected to the fence member 48 and the second ends 58 are slidably connected to the fence member 50, thereby forming a rectangular fence enclosure 55 of variable width. The selectable width capability serves two functions. First, it permits the second jaw 34 to be moved relative to the first jaw 32 without removal or disassembly of the fence 6. Second, the opposing members 48 and 50 are selectively engageable with the jaws 32 and 34 so as to enable offsetting the opposing members 48 and 50 from the workpiece engaging surfaces 36.

The guide fence 6 is adjustably mounted on the workpiece clamp 4 by fence-to-jaw fastener bolts 60 and wingnuts 62 extending through slots 56 with downwardly-open channels 53 in the clamp jaws 32, 34 and holes 58 in the fence members 48, 50. The rails 52, 54 have fixed ends 57 which are fixedly attached to the fence member 48 in attachment notches 59 formed in the fence member 48. The rails 52, 54 are slidably received in slide notches 61 extending across the fence member 50. The rails 52, 54 terminate at free ends 63.

The members 48, 50 and the rails 52, 54 of the fence 6 are substantially flat, providing a relatively uniform surface to guide the movement of the router 12. Guide blocks 10 may be placed alone or in combination against the fence 6 in the enclosure 55 for the routering of angled, curved and offset straight cuts, see FIG. 5. The guide blocks 10 comprise one or more flat surfaces for engaging the guide fence 6, and surfaces incorporating angles or the like for engaging the router 12. When routering, the angle or curve of a particular guide block surface will be reproduced on the workpiece 14 as the router 12 is guided along the block 10. The blocks 10 may be used in combination, to increase the number of available designs. For instance, a forty-five degree block and a thirty degree block can be combined to form a seventy-five degree angle. Using an offset flat block and an angled block would form an offset angle.

Likewise, blocks can be contoured to produce specialized cuts, such as curves and the like.

To produce consistent and accurate alphanumeric characters and the like in workpieces 14, a plurality of indexing scales 8 are positioned around the router working surface 44, see FIG. 2. The first indexing scale 8 is the longitudinal workpiece index 64, located inside the router working area or fence enclosure 55 on the second jaw 34, adjacent the workpiece engaging surface 38. The second indexing scale, the longitudinal router index 66, is located on member 48 of the guide fence 6, opposite of, but in the same longitudinal position as, the workpiece scale 64, such that a reading of "1" on scale 64 would correspond on the workpiece to a similar reading on scale 66. A lateral indexing scale 68 is located along the top surface of rail 54. Additional lateral indexing scales 69 can be provided on top of each jaw 32, 34 adjacent to the handles 42 thereof for interacting with pointers 70 which extend from the ends of the router guide fences 6.

Indicia 65, such as the integers 1–6 located alongside the lateral scales 69, can be provided alongside the indexing scales 8 for counting and designating increments. For example, the indicia 65 can correspond to increments of one-fourth of an inch each on the lateral scales 69. In this embodiment, the term "longitudinal" describes a direction generally parallel to the workpiece engaging surfaces 36 and 38, and the term "lateral" describes a direction perpendicular thereto across the workpiece surface. However, these designations are for descriptive purposes only and are not intended to be limiting.

Using the longitudinal indexing scales 64 and 66, longitudinal cuts of a predetermined length and position may be made on the workpiece. The cuts may be offset from the edge of the workpiece 14 or other reference point by positioning the guide fence members 48 and 50 a distance of one-half the width of the base of the router 12 from the centerline of the desired cut. Where the centerline of the cut is beyond the adjustable range of members 48 and 50, a rectangular guide block 10 can be positioned adjacent member 48 or 50 so that the opposite edge of the guide block 10 is one-half the width of the router base from the desired centerline. The length of a longitudinal cut can be controlled by aligning a reference point on the router 12, preferably corresponding to the centerline of the router 12, with a starting point on one of the longitudinal scales 64 or 66 and moving the router 12 along the guide surface 44 to a point the desired distance away. Likewise, lateral cuts can be routered on a workpiece 14 by positioning the workpiece 14 such that the location of the cut is one-half the width of the router base from rail 52 or 54. The length of the cut can be controlled as described for a longitudinal cut, using a reference point on the router 12.

In operation, once a workpiece 14 is positioned and clamped with the workpiece clamp 4, the desired offset of members 48 and 50 may be set by securing fasteners 60 with wingnuts 62 and positioning appropriate guide blocks 10 if required. Longitudinal straight cuts 72 parallel to either member 48 or 50 may then be routed. Lateral straight cuts 74 may be positioned by longitudinally moving the workpiece 14 such that the location of the cut is one-half the width of the router base from the rail 52 or 54. For example, to cut a capital "E", the vertical back and two outside horizontal arms could be cut. Because the cutting tool is equidistant from the perimeter of the router 12 at any angle around the circumference of a round base router, and one-half the width away from the edge of a rectangular base router, these cuts would be a uniform distance from the fence members 48, 50 along which they were cut, (for example, see FIG. 2). The distance of the outside arms from the workpiece edges would be determined by the offset used. The length of the arms would be controlled using the indexing scales 8. To make the middle arm, a rectangular guide block 10 could be placed against one of the members 48 and 50 so as to locate the center of the router 12 at the center of the back of the "E". Moving the router 12 the desired distance along the side as measured on the appropriate longitudinal indexing scale 64 or 66 would produce the middle arm. In a similar manner, by the use of angled guide blocks 10, characters such as the letters "M", "N", "R" and the like could be cut, see FIG. 5.

When all of the cuts on a particular segment of workpiece 14 are complete, for routering a new character or making additional cuts on a character which is larger than the working area defined by the router fence 6, the wingnuts 40 may be loosened so as to permit withdrawal of the second jaw 34 and repositioning of the workpiece using the longitudinal scales 64, 66 for accurate spacing.

Intersections between cuts, for instance the intersection of the loop and angled leg of a letter "R", can be located using indexing scales 8, thereby eliminating the need for templates for the routering of alphanumeric characters and the like.

FIG. 7 shows a router guide system 101 comprising a modified or alternative embodiment of the present invention. The router guide system 101 includes knobs 102 with female-threaded receivers 103 on carriage bolts 104. The knobs 102 can be used in place of the wingnuts 40, 62 in the embodiment described above. The threaded knobs 102 can assume any appropriate configuration, and preferably will facilitate clamping and releasing procedures by hand whereby the router guide system 101 can be adjusted in various ways without having to utilize tools. However, female-threaded nuts with other configurations (e.g. square or hexagonal) could be employed in place of the wingnuts 40, 62 and the knobs 102 and could be tightened and untightened with suitable wrenches, pliers, etc.

It is to be understood that while certain forms of the present invention have been illustrated and described herein, it is not to be limited to the specific forms or arrangement of parts described and shown. For example, knobs with female-threaded receivers could be used in place of the wingnuts 40, 62.

What is claimed and desired to be secured by Letters Patent is as follows:

1. A system for guiding a router on a workpiece, which includes:
   (a) a base with a workpiece-engaging surface;
   (b) a workpiece clamp including a pair of opposing jaws with upper surfaces, said jaw upper surfaces forming a router working surface with said workpiece;
   (c) means for adjustably mounting said clamp on said base with said workpiece between said jaws;
   (d) a router guide fence including means for slidably engaging and guiding a router; and
   (e) means for mounting said fence on said clamp on top of said router working surface.

2. The invention of claim 1 wherein said clamp mounting means includes:
   (a) said base having a pair of slots extending in parallel, spaced relation and open at said base workpiece-engaging surface;
   (b) each said jaw having a pair of holes in spaced relation corresponding to the spacing between said slots; and
   (c) a plurality of mechanical fasteners each extending through a respective jaw hole and a respective base slot.
3. The invention of claim 2 wherein each said mechanical fastener includes:
   (a) a male-threaded bolt received in a respective base slot and a respective jaw hole; and
   (b) a wingnut threadably receiving said bolt.
4. The invention of claim 2 wherein each said mechanical fastener includes:
   (a) a male-threaded bolt received in a respective base slot and a respective jaw hole; and
   (b) a knob with a female-threaded receiver threadably receiving said bolt.
5. The invention of claim 1 wherein said router guide fence includes:
   (a) a pair of members each mounted on a respective jaw upper surface;
   (b) a pair of rails each mounted on said members and extending transversely therebetween; and
   (c) a rectangular fence enclosure bounded by said rails and said members.
6. The invention of claim 5 wherein each said fence rail includes:
   (a) a fixed end fixedly attached to one of said fence members; and
   (b) a free end.
7. The invention of claim 6, which includes:
   (a) the other of said fence members having a pair of slide notches each slidably receiving a respective fence rail.
8. A system for guiding a router on a workpiece with upper and lower workpiece surfaces and opposite workpiece edges, which comprises:
   (a) a base with an upper, workpiece-engaging surface and a pair of slots extending in parallel, spaced relation;
   (b) a clamp including:
      (1) a pair of jaws each having a workpiece-engaging edge and a pair of holes positioned in spaced relation corresponding to the spacing between said base slots; and
      (2) a plurality of mechanical clamp-to-base fasteners each extending through a respective base slot and a respective jaw hole;
   (c) a fence assembly including:
      (1) a pair of opposite members;
      (2) means for mounting each fence member on a respective jaw;
      (3) a pair of fence rails each having a fixed end fixedly connected to one of said fence members and a free end; and
      (4) means for slidably connecting each said rail to the other of said fence members; and
      (5) said fence members and said fence rails forming a substantially rectangular fence enclosure.
9. The invention of claim 8 wherein:
   (a) said means for slidably connecting said rails to the other of said fence members comprises a pair of slide notches in the other of said fence members, each said notch slidably receiving a respective rail.
10. The invention of claim 8, which includes:
    (a) means for guiding a router at an angle with respect to said fence members and said fence rails.
11. The invention of claim 10 wherein said means for guiding said router at an angle with respect to said fence rails and said fence members comprises:
    (a) a triangular guide fence block.
12. The invention of claim 8 wherein each said mechanical fastener comprises:
    (a) a male-threaded bolt extending through a respective slot and through a respective jaw hole; and
    (b) a wingnut threadably mounted on said bolt.
13. The invention of claim 8 wherein each said mechanical fastener includes:
    (a) male-threaded bolt extending through a respective slot and through a respective jaw hole; and
    (b) a knob with a female-threaded receiver threadably mounted on said bolt.
14. The invention of claim 8 wherein said means for mounting said fence members on said jaws comprises:
    (a) a plurality of mechanical fasteners.
15. A system for guiding a router including a base with a perimeter and a rotating bit projecting downwardly from the router base on a workpiece including an upper surface, a lower surface and opposite side edges, which includes:
    (a) a base including:
       (1) upper and lower surfaces;
       (2) top and bottom edges;
       (3) opposite side edges;
       (4) a cutout handle in proximity to and spaced from said top edge and substantially centered between said side edges; and
       (5) a pair of base slots extending in parallel, spaced relation to each other and to said side edges, each said base slot having a downwardly-open channel;
    (b) a workpiece clamp including first and second jaws each having:
       (1) a pair of opposite, curved, handle ends;
       (2) a workpiece-engaging edge;
       (3) a pair of clamp-to-base fastener receivers spaced apart a distance approximately equal to the spacing of said base slots;
       (4) a pair of jaw slots extending in parallel, spaced relation to each other and each having a downwardly-open channel;
       (5) a pair of clamp-to-base fasteners each comprising a nut and a bolt extending through a respective clamp-to-base receiver and through a respective base slot, each bolt including a head slidably received in said base slot channel and a shank threadably mounting said nut;
       (6) upper and lower surfaces; and
       (7) a recess on the jaw upper surface adjacent the workpiece-engaging edge intermediate the ends;
    (c) a guide fence including:
       (1) first and second members each having a pair of receivers spaced apart a distance approximately corresponding to a spacing between said jaw slots;
       (2) said first member having a pair of upwardly-open fixed attachment notches;
       (3) said second member having a pair of upwardly-open slide attachment notches;

(4) a pair of fence rails each including a fixed end fixedly received in a respective first member fixed attachment notch and a free end, each said fence rail being slidably received in a respective slide attachment notch intermediate its ends;

(5) a plurality of fence-to-clamp fasteners each including a bolt received in a respective jaw slot and in a respective member receiver, each said bolt including a male-threaded shank and a head slidably received in a respective jaw slot channel, each said fastener further including a female-threaded nut threadably received on a respective bolt shank; and (6) a fence enclosure formed by said members and said rails; and (d) means for indexing said clamp position relative to said base, said indexing means including:

(1) one of said jaws having a longitudinal workpiece scale in proximity to and substantially centered on its workpiece-engaging edge;

(2) each said jaw having a pair of lateral scales adjacent to its ends;

(3) each said jaw including a pair of end pointers extending from said jaw ends in spaced relation approximately corresponding to the spacing between said lateral scales;

(4) a fence member longitudinal scale on one of said fence members in proximity to said fence enclosure; and (5) a fence rail lateral scale on one of said fence rails in proximity to said fence enclosure.

16. The invention of claim 15 wherein said nuts comprise wingnuts.

17. The invention of claim 15 wherein said nuts comprise knobs with female-threaded receivers.

* * * * *